(12) United States Patent
Faurie et al.

(10) Patent No.: US 9,532,274 B2
(45) Date of Patent: *Dec. 27, 2016

(54) DETERMINATION OF APPROPRIATE RADIO RESOURCE TO BE REQUESTED IN CASE OF A CIRCUIT-SWITCHED (CS) FALLBACK PROCEDURE

(71) Applicant: BlackBerry Limited, Waterloo (CA)

(72) Inventors: Rene Faurie, Versailles (FR); Claude Jean-Frederic Arzelier, Slough (GB)

(73) Assignee: BlackBerry Limited, Waterloo, Ontario (CA)

(*) Notice: Subject to any disclaimer, the term of this patent is extended or adjusted under 35 U.S.C. 154(b) by 16 days.

This patent is subject to a terminal disclaimer.

(21) Appl. No.: 14/540,983

(22) Filed: Nov. 13, 2014

(65) Prior Publication Data

US 2015/0071252 A1   Mar. 12, 2015

Related U.S. Application Data

(63) Continuation of application No. 13/244,837, filed on Sep. 26, 2011, now Pat. No. 8,929,310, which is a
(Continued)

(30) Foreign Application Priority Data

Nov. 9, 2009 (EP) .................................. 09306075

(51) Int. Cl.
*H04W 36/00* (2009.01)
*H04W 68/12* (2009.01)
*H04W 72/04* (2009.01)

(52) U.S. Cl.
CPC ......... *H04W 36/0022* (2013.01); *H04W 68/12* (2013.01); *H04W 72/0413* (2013.01)

(58) Field of Classification Search
None
See application file for complete search history.

(56) References Cited

U.S. PATENT DOCUMENTS 6,314,292 B1   11/2001   Ho et al.
7,710,916 B2   5/2010   Kyung et al.
(Continued)

FOREIGN PATENT DOCUMENTS

CN   101222765   7/2008
EP   1983789   10/2008
(Continued)

OTHER PUBLICATIONS

"3rd Generation Partnership Project; Technical Specification Group Services and System Aspects; Circuit Switched Fallback in Evolved Packet System; Stage 2 (Release 8)"; 3GPP Standard; 3GPP TS 23.272 V8.5.0; Sep. 2009; pp. 1-31.
(Continued)

*Primary Examiner* — Faruk Hamza
*Assistant Examiner* — Cassandra Decker
(74) *Attorney, Agent, or Firm* — Fish & Richardson P.C.

(57) ABSTRACT

A system and method for implementing fallback on a wireless device for circuit switched fallback from a first network that does not provide a circuit switched domain service is presented. A paging message is received from the first network. The paging message instructs the wireless device to implement circuit switched fallback to a circuit switched network. The paging message is inspected for information indicative of a service associated with the paging message, and a channel type suitable for the service is determined from the information indicative of the service. A request message for initiating the establishment of a radio
(Continued)

connection is transmitted. The request message identifies the suitable channel type, and the service is used on the circuit switched network.

12 Claims, 8 Drawing Sheets

Related U.S. Application Data continuation of application No. 12/941,487, filed on Nov. 8, 2010, now abandoned.

(56) References Cited

U.S. PATENT DOCUMENTS

| | | |
|---|---|---|
| 2002/0128002 A1 | 9/2002 | Vu |
| 2006/0239229 A1 | 10/2006 | Marinescu et al. |
| 2006/0268781 A1 | 11/2006 | Svensson et al. |
| 2006/0293066 A1 | 12/2006 | Edge et al. |
| 2007/0041343 A1 | 2/2007 | Barreto et al. |
| 2008/0049725 A1 | 2/2008 | Rasanen |
| 2008/0080428 A1 | 4/2008 | Jappila et al. |
| 2009/0036130 A1 | 2/2009 | Diachina et al. |
| 2009/0042576 A1 | 2/2009 | Mukherjee et al. |
| 2010/0098023 A1 | 4/2010 | Aghili et al. |
| 2010/0202413 A1 | 8/2010 | Vikberg et al. |
| 2010/0260105 A1 | 10/2010 | Keller et al. |
| 2010/0297979 A1 | 11/2010 | Watfa et al. |
| 2010/0302937 A1 | 12/2010 | Hu et al. |
| 2010/0330959 A1 | 12/2010 | Mildh et al. |
| 2011/0013623 A1 | 1/2011 | Hu et al. |
| 2011/0075675 A1 | 3/2011 | Koodli et al. |
| 2011/0080867 A1 | 4/2011 | Mildh |

FOREIGN PATENT DOCUMENTS

| | | |
|---|---|---|
| WO | 2009/026835 | 3/2009 |
| WO | 2009/094916 | 8/2009 |
| WO | 2009/097814 | 8/2009 |

OTHER PUBLICATIONS

"3rd Generation Partnership Project; Technical Specification Group Services and System Aspects; Circuit Switched Fallback in Evolved Packet System; Stage 2 (Release 9)"; 3GPP Standard; 3GPP TS 23.272; 3rd Generation Partnership Project; vol. 9.1.0; Sep. 1, 2009; pp. 1-60.

Ericsson et al.; "Missing Establishment Cause Code Mapping for CS Fallback"; 3GPP Draft (C1-094219); 3rd Generation Partnership Project; Oct. 12, 2009; p. 1.
Tanaka, I. et al.; "CS Fallback Function for Combined LTE and 3G Circuit Switched Services"; NTT Docomo Technical Journal; vol. 11, No. 3; Sep. 2009.
Telefonaktiebolaget LM Ericsson; "Specification of the Value of the MS Capability Paging Indication When Used at CS Fallback Procedure"; 3GPP TSG-GERAN WG2 Meeting 43bis (G2-090179); Oct. 22, 2009; pp. 1-4.
Telefonaktiebolaget LM Ericsson; "Specification of the Value of the MS Capability Paging Indication When Used at CS Fallback Procedure"; 3GPP TSG-GERAN WG2 Meeting 43bis (G2-090269); Oct. 22, 2009; pp. 1-7.
Tdoc N1-011973, 3GPP TSG-CN1 Meeting #21, Cancun, Mexico, Nov. 26-30, 2001.
PCT International Search Report and Written Opinion issued in PCT Application No. PCT/CA2010/001739 on Jan. 27, 2011.
International Preliminary Report on Patentability issued in International Application No. PCT/CA2010/001739 on May 15, 2012; 7 pages.
Extended European Search Report issued in European Application No. 09306075.4 on May 6, 2010; 9 pages.
Extended European Search Report issued in European Application No. 12174335.5 on Aug. 14, 2012.
Communication Pursuant to Article 94(3) EPC issued in European Application No. 12174335.5 on Jul. 17, 2013; 5 pages.
Communication Pursuant to Article 94(3) EPC issued in European Application No. 12174335.5 on Jan. 22, 2013; 3 pages.
Office Action issued in U.S. Appl. No. 13/244,837 on Nov. 8, 2011; 22 pages.
Office Action issued in U.S. Appl. No. 13/244,837 on Apr. 9, 2012; 29 pages.
Advisory Action issued in U.S. Appl. No. 13/244,837 on Jun. 15, 2012; 3 pages.
Office Action issued in U.S. Appl. No. 12/941,487 on Feb. 4, 2013; 12 pages.
Office Action issued in Japanese Application No. 2012-537272 on Jul. 24, 2013; 28 pages.
Office Action issued in Japanese Application No. 2012-537272 on Nov. 18, 2013; 10 pages.
Notice of Allowance issued in Japanese Application No. 2012-537272 on Mar. 11, 2014; 3 pages.
Office Action issued in Korean Application No. 10-2012-7013356 on Nov. 27, 2013; 6 pages.
Notice of Allowance issued in Korean application No. 10-2012-7013356 on Jun. 23, 2014; 3 pages.
Office Action issued in Chinese Application No. 201080050479.X on Mar. 4, 2014; 7 pages. No translation.
Office Action issued in Canadian Application No. 2,779,737 on Apr. 30, 2014; 3 pages.

DETERMINATION OF APPROPRIATE RADIO RESOURCE TO BE REQUESTED IN CASE OF A CIRCUIT-SWITCHED (CS) FALLBACK PROCEDURE

CROSS-REFERENCE TO RELATED APPLICATIONS

This application is a continuation of U.S. application Ser. No. 13/244,837, filed on Sep. 26, 2011, which is a continuation of U.S. application Ser. No. 12/941,487, filed Nov. 8, 2010, which claims priority to European Patent Application No. 09306075.4 entitled "Determination of Appropriate Radio Resource to be Requested in Case of a Circuit-Switched (CS) Fallback Procedure", filed on Nov. 9, 2009, the applications are incorporated by reference.

BACKGROUND

The present disclosure relates generally to systems and methods for communications between a wireless device or user agent (UA) and a network and, more particularly, to systems and methods for coordinating communications resources between wireless devices and networks including circuit switched networks.

As used herein, the term "user agent" or UA can refer to wireless devices such as mobile telephones, personal digital assistants (PDAs), handheld or laptop computers, and similar devices, including mobile stations (MS) or user equipment (UE) that have telecommunications capabilities. In some embodiments, a UA may refer to a mobile, wireless device. The term "UA" may also refer to devices that have similar capabilities but that are not generally transportable, such as desktop computers, set-top boxes, or network nodes.

A UA may operate in a wireless communication network that provides high-speed data and/or voice communications. The wireless communication networks may implement circuit-switched (CS) and/or packet-switched (PS) communication protocols to provide various services. For example, the UA may operate in accordance with one or more of an Enhanced Universal Terrestrial Radio Access Network (E-UTRAN), Universal Terrestrial Radio Access Network (UTRAN), Global System for Mobile Communications (GSM) network, Evolution-Data Optimized (EV-DO), Digital Enhanced Cordless Telecommunications (DECT), Digital AMPS (IS-136/TDMA), Integrated Digital Enhanced Network (iDEN), Universal Mobile Telecommunications System (UMTS), Enhanced Data rates for GSM Evolution (EDGE), GPRS/EDGE Radio Access Network (GERAN) and General Packet Radio Service (GPRS) technology. Other wireless networks that UAs may operate in include but are not limited to Code Division Multiple Access (CDMA), cdma2000, cdma2000 1xRTT, cdma2000 HRPD, WLAN (e.g. IEEE 802.11) and WRAN (e.g. IEEE 802.22). UAs may also operate in fixed network environments such as, for example, Digital Subscriber Line (xDSL) environments, Data Over Cable Service Interface Specification (DOCSIS) cable networks, Wireless Personal Area Networks (PAN), Bluetooth, ZigBee, Wireless Metropolitan Area Networks (MAN) (e.g., WiMAX, IEEE 802.20, IEEE 802.22 Ethernet) or optical networks. Some UAs may be capable of multimode operation where they can operate on more than one access network technology either on a single access network at a time or in some devices using multiple access technologies simultaneously.

In wireless telecommunications systems, transmission equipment in a base station transmits signals throughout a geographical region known as a cell. As technology has evolved, more advanced equipment has been introduced that can provide services that were not possible previously. This advanced equipment might include, for example, an evolved universal terrestrial radio access network (E-UTRAN) Node B (eNB) rather than a base station or other systems and devices that are more highly evolved than the equivalent equipment in a traditional wireless telecommunications system. Such advanced or next generation equipment may be referred to herein as long-term evolution (LTE) equipment, and a packet-based network that uses such equipment can be referred to as an evolved packet system (EPS). As used herein, the term "access device" will refer to any component, such as a traditional base station, eNB, or other LTE access device, that can provide a UA with access to other components in a telecommunications system.

The different networks described above provide varying services to connected UAs. Some networks, for example, provide only PS services and cannot provide CS voice or other CS domain services. As such, a UA may be configured to connect to multiple network-types to access both PS and CS domain services. For example, if a UA is connected to a first network cell that does not provide CS domain services, the UA may be configured to implement a CS fallback procedure, which may be referred to herein as "CS fallback", to connect to an accessible network such as a GERAN or Universal Terrestrial Radio Access Network (UTRAN) to access the voice or other CS domain services provided by those networks. As such, the CS fallback procedure allows a UA connected to a network using a first radio access technology (RAT) and that provides only PS domain services, to connect to another network that provides CS domain services. CS fallback may be used, for example, to initiate voice calls via a cell of a network providing CS domain services, when, at the time of initiating the voice call, the UA was associated to a cell of a network that only provides PS domain services. The UA initiating the voice call may be either idle or connected (e.g., active) on the cell of the network that only provides PS domain services. In case the UA is idle, it can be said to be camped on the cell and may be monitoring the paging channel of that cell for paging messages for mobile terminated sessions or calls. In case the UA is connected, it may be communicating with the cell and transferring data for a PS domain service.

Turning to FIG. 1, an example CS fallback process is illustrated whereby a UA 10 transitions from an E-UTRAN network cell 12 to a GERAN or UTRAN cell 14 to access CS domain services for initiating a voice call. As will be described, to facilitate CS fallback, the UA 10 may be configured to communicate with both PS-based and CS-based networks. For example, the UA 10 may support combined procedures for EPS/International Mobile Subscriber Identity (IMSI) attach, and Tracking Area update for registering with a Mobility Management Entity (MME) to access PS domain services (for example, via an E-UTRAN, UTRAN or GERAN access network) and for registering with a Mobile Switching Center (MSC) to access CS domain services (for example, via a UTRAN or GERAN access network or another network supporting CS domain services). The combined procedures also allow the MSC and MME to create an association between one another so that each is aware that the UA 10 is simultaneously registered with both the MSC and MME and that, therefore, the UA 10 is registered with both the PS and CS network.

FIG. 2 is a data flow diagram illustrating an example data flow for a mobile-terminated CS fallback procedure where the UA 10 in connected mode is redirected to GERAN or UTRAN. In FIG. 1, the UA 10 is initially connected to E-UTRAN cell 12. Because E-UTRAN cell 12 does not provide CS domain services, UA 10 implements CS fallback to communicate with the GERAN or UTRAN cell 14 to access CS domain services provided thereby.

By way of example, a network assisted cell change (NACC) related to a mobile originated voice call will be described. Referring to FIGS. 1 and 2, the example process begins by a MSC 16 sending a CS paging 18 to a MME 20, which in turn prompts the MME 20 to send a CS service notification paging 22 to the UA 10. In FIG. 1 communications from the E-UTRAN cell 12 are indicated by arrow 23 and communications from the UA 10 to the E-UTRAN cell 12 are indicated by arrow 25. Responsive to the CS service notification paging 22, the UA 10 sends an Extended service request 24 to the eNB 26 of the E-UTRAN cell 12. However, the E-UTRAN cell is not configured to provide CS domain services. Thus, the MME 20 sends a S1 application protocol (S1-AP) message with a CS fallback indicator 30 to the eNB 26.

To streamline the exemplary data flow, FIG. 2 indicates some data flows by boxes, such as optional measurement report 32 which may be provided by the UA 10 to indicate information, such as signal strength and the like of neighboring cells to which it may be assigned. That is, when performing CS fallback, the UA 10 may be in the best position to determine which cell or cells are candidate cells to which to fallback. As such, the UA 10 can detect which cells are in close proximity or have particularly strong received signal strength or quality (or other such parameters), and hence with which cells the UA 10 would likely have a successful connection following the CS fallback process. Accordingly, during the CS fallback process, the UA 10 may undertake a measurement step to detect and identify the cells accessible to the UA 10. In other words, before falling back to a cell providing CS domain services, the UA 10 may search for available candidate network cells via a measurement process.

The eNodeB (eNB) may trigger an inter-RAT cell change order, optionally with NACC signal 34 that is sent to the UA 10, alternatively a connection release with redirection is signaled 36. The eNB 26 indicates, according to S1-AP, a UA context release request 38 to the MME 20. Thereafter, the S1 UA context release 40 takes place, a location area (LA) update, a combined routing area (RA)/LA update, a RA update, or a LA update and RA update 42 occurs in the new GERAN or UTRAN cell. If the target RAT is GERAN, a suspension of PS services may take place if the new cell or the UA does not support concurrent CS and PS services. In this case, a suspend message 44 is sent from the UA 10 to a base station system (BSS) 46, which is then communicated from the BSS 46 to a serving GPRS (general packet radio service) Support Node (SGSN) 48. Thereafter, a suspend request/response 50 is communicated between the SGSN 48 and MME 20 and an update of bearer(s) 52 takes place between the MME 20 and a serving gateway (S-GW) 54.

The UA 10 signals a paging response 56 to the BSS/RNS 46, which in turn forwards this paging response to the MSC 16. If the CS fallback entails a change of the MSC 16, additional steps may be carried out, as indicated in box 58, such as communicating a connection rejection 60 from the MSC 16 to the BSS!RNS 46, communicating a connection release 62 from the BSS/RNS 46 to the UA 10, and an LA update or combined RA/LA update 64. Finally, a CS call establishment procedure 66 occurs, such that, as indicated in FIG. 1, the UA 10 can move, as indicated by arrow 68, from communicating with the E-UTRAN cell 12 to communicate, as indicated by arrow 70, with the GERAN or UTRAN cell 14 over a CS channel, When implementing CS fallback, delay may be a concern. If the UA 10 is initially camped on E-UTRAN cell 12 and wishes to access CS domain services in the GERAN or UTRAN Cell 14, a CS fallback process may be executed. While a radio resource control (RRC) connection setup procedure of the CS fallback process may be relatively short (e.g., about 150 ms is the target time for the E-UTRA system design), measurement steps and a step for selecting the target cell for CS domain services can potentially take a significant amount of time. As such, CS fallback may be delayed resulting in delays in establishing the CS domain services, possibly delaying the establishment of a connection for the user or negatively affecting other services accessed by the UA 10.

In addition to this potential for a user experiencing a perceivable delay in services, CS fallback can result in inefficient or inappropriate uses of network resources. For example, when a UA is paged in a GERAN or UTRAN network for a mobile-terminating call, some information is communicated by the network in the paging message. That is, the paging message may provide an indication of the service for which the UA is paged, or an indication of the appropriate radio channel type for supporting the service. Similarly, in case of a mobile-originating (MO) call, the UA is indicating to the network an establishment cause reflecting the service or the channel type requested. Thus, the network can reasonably allocate channels appropriate for the desired communication.

However, such information either is not available on the corresponding E-UTRAN interfaces used when initiating the CS fallback procedure, or is available but is not assessed for requesting/allocating the radio channels in GERAN, UTRAN or E-UTRAN. As a consequence, the network may decide to allocate non-optimal resources, such as a signaling channel for serving a voice call, which can affect the CS fallback performance, or a traffic channel for serving a signaling procedure, causing a waste of the radio resource.

Thus, systems and methods that address the above-listed issues and allow the setting and the usage of optimal resources for CS fallback would provide a useful improvement in the art.

BRIEF DESCRIPTION OF THE DRAWINGS

In the accompanying drawings, like reference numerals represent like parts or operations.

DETAILED DESCRIPTION

Figure 1:
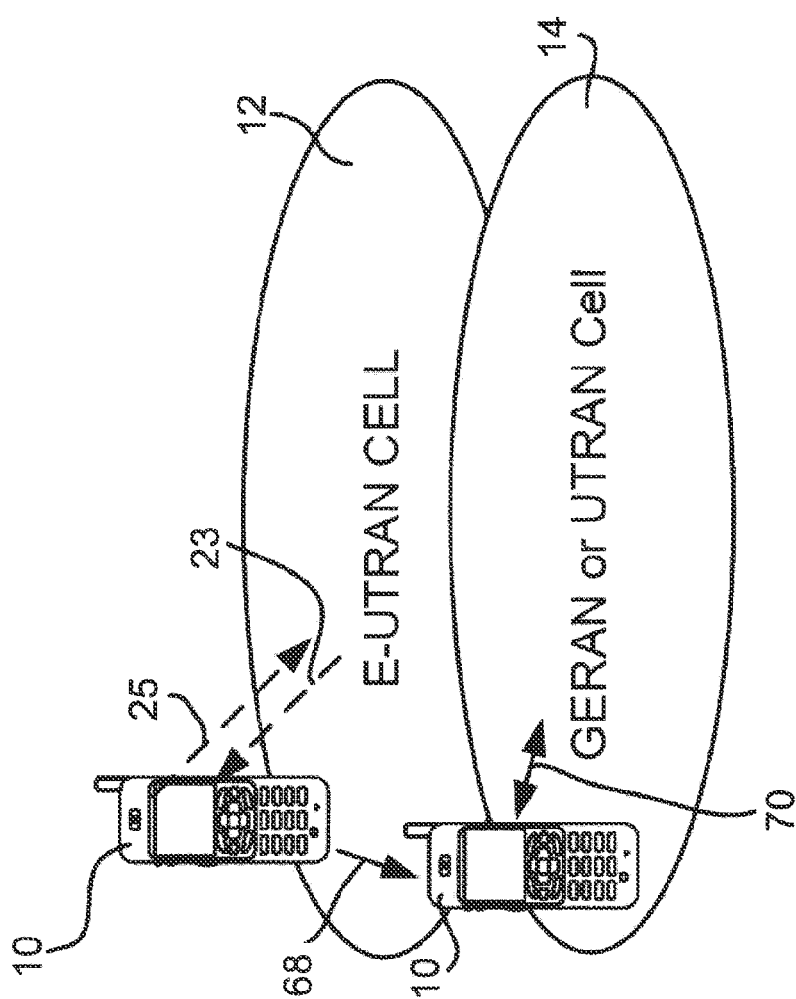
FIG. 1 is an illustration of an example CS fallback process wherein a UE transitions from an E-UTRAN cell to a GERAN or UTRAN cell to access CS domain services for initialing a voice call.

The present disclosure provides a system and method for circuit-switched (CS) fallback and, specifically, for minimizing delay, optimizing radio resource allocation and improving reliability for CS fallback.

One embodiment of the invention includes a method for implementing fallback on a wireless device for circuit switched fallback from a first network that does not provide a circuit switched domain service. The method includes receiving a paging message from the first network. The paging message instructs the wireless device to implement circuit switched fallback to a circuit switched network. The method includes inspecting the paging message for information indicative of a service associated with the paging message, determining from the information indicative of the service a channel type suitable for the service, and transmitting a request message for initiating the establishment of a radio connection. The request message identifies the suitable channel type. The method includes using the service on the circuit switched network.

Other embodiments include a wireless device configured to perform circuit switched fallback from a first network that does not provide a circuit switched domain service including a processor configured to construct a service request message. The service request message identifies a cause for a circuit-switched (CS) service to be provided by a circuit switched network. The processor is configured to transmit the service request message to the first network. The service request message initiates a fallback procedure. The processor is configured to establish a connection to the circuit switched network, and use the CS service on the circuit switched network.

Other embodiments include a wireless device configured to perform circuit switched fallback from a first network that does not provide a circuit switched domain service including a processor configured to receive a paging message from the first network. The paging message instructs the wireless device to implement circuit switched fallback to a circuit switched network. The processor is configured to inspect the paging message for information indicative of a service associated with the paging message, determine from the information indicative of the service a channel type suitable for the service, and transmit a request message for initiating the establishment of a radio connection. The request message identifies the suitable channel type. The processor is configured to use the service on the circuit switched network.

The various aspects of the disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (for example, hard disk, floppy disk, magnetic strips, and the like), optical disks (for example, compact disk (CD), digital versatile disk (DVD), and the like), smart cards, and flash memory devices (for example, card, stick, and the like). Additionally, it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 3:
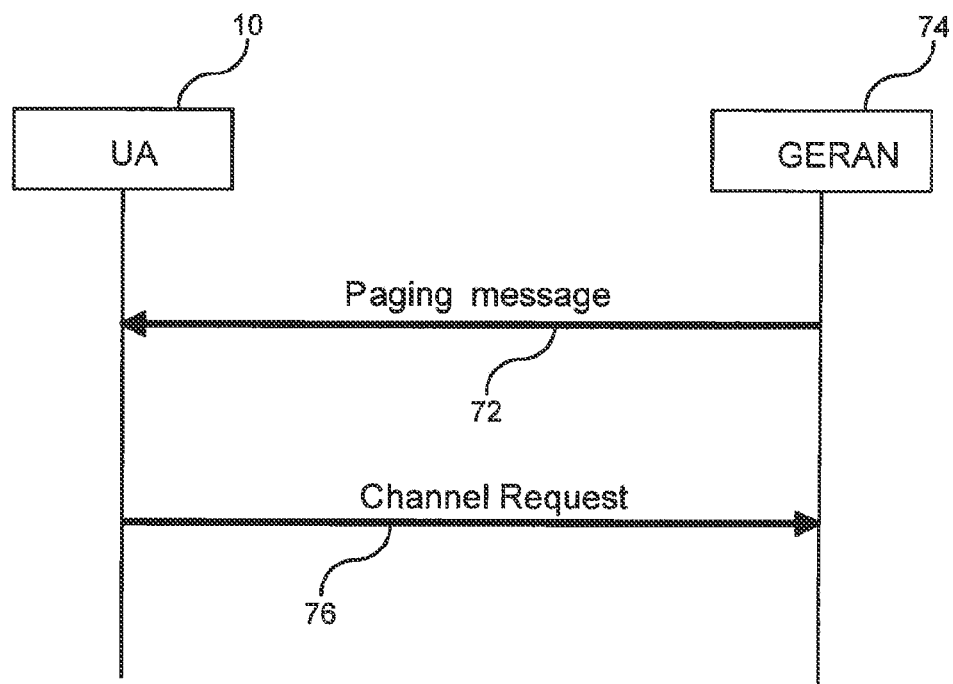
FIG. 3 is a data flow diagram illustrating an example Mobile Terminating call initiation in a GERAN network wherein the UA is in idle mode.

As addressed above, there is the potential for CS fallback to cause the allocation of non-optimal resources such as a signaling channel for serving a voice call, which can create situations that affect the CS fallback performance, or a traffic channel for serving a signaling procedure, causing a waste of radio resources. For example, turning to FIG. 3, in the case of a Mobile Terminating call initiation in GERAN, the UA 10 is typically provided with the "Channel Needed" indication in a paging message 72 sent by the GERAN network 74, which is information that signals the more suitable radio channel for supporting the service for which the UA is paged, for example, Stand-Alone Dedicated Control Channel (SDCCH) signaling channel, traffic channel (TCH)/full(F). The UA 10 then sends an appropriate channel request 76 to the GERAN network 74 taking into account the "Paging indication" of the "Channel Needed" element received in the paging message 72 and the UA's 10 own capability (full rate only, dual rate, SDCCH only), which allows the BSS to grant the most desirable channel. For example, Table 1 below lists the channel request messages when answering a paging for RR connection establishment.

TABLE 1

| MS Capability Paging Indication | Full rate only | Dual rate | SDCCH only |
|---|---|---|---|
| Any channel | 100xxxxx | 100xxxxx | 100xxxxx |
| SDCCH | 0001xxxx | 0001xxxx | 0001xxxx |
| TCH/F | 100xxxxx | 0010xxxx | 0001xxxx |
| TCH/H or TCH/F | 100xxxxx | 0011xxxx | 0001xxxx |

Figure 2:
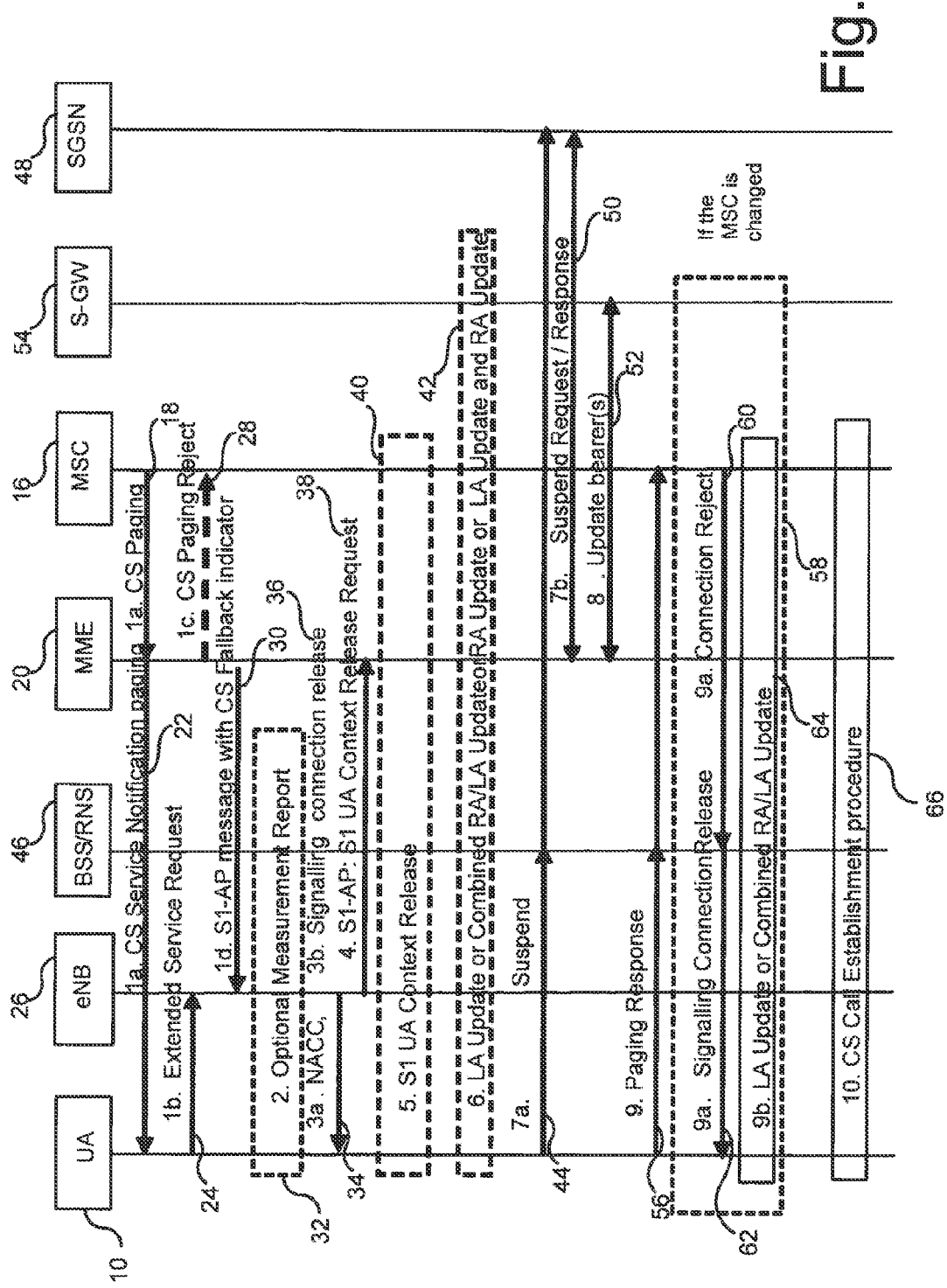
FIG. 2 is a data flow diagram illustrating an example data Flow for a Mobile Terminating CS fallback procedure where a UA in connected mode is redirected to GERAN or UTRAN without PS Handover.

However, in the case of paging a UA in E-UTRAN for a CS fallback terminating session, the paging (CS service notification) sent by the MME 20, as described with respect to FIG. 2, to the UA 10 in connected mode in the source (packet only) network does not contain any "Paging Indication" information. This paging notification may include information about the service for which the mobile station is paged (e.g. Supplementary Service code, location service (LCS) indicator). In case the paging is made for reaching a UA 10 in Idle mode, (see, for example, FIG. 6), the paging messages sent over the S1 interface and over the radio interface do not even contain any indication of the service for which the mobile station is paged. Furthermore, the GERAN RR protocol does not specify how the UA should build the Channel Request when answering the page when triggered by the CS fallback procedure. This means that the existing channel request procedure defined for GERAN is not applicable as such for CS fallback (lack of "Paging Indication") for determining the proper and optimal information in channel request message that may be sent in the target network.

As a result, a CS fallback to GERAN could lead to inconsistent UA implementations, for example, requesting for a channel type inappropriate to the service being activated, resulting in the waste of the resources allocated or a longer establishment time. In particular, the request and initial allocation of a SDCCH in case of a voice call setup will delay the voice path establishment compared with the case where a traffic channel (TCH) is requested and allocated in signaling only mode (higher latency of SDCCH compared to TCH, longer time for assigning the TCH in speech mode if a SDCCH has been allocated compared to a channel mode modification procedure while staying on the same TCH channel). In other scenarios, the request and initial allocation of a TCH in signaling only mode would waste radio resource if the service, for example, location service or supplementary service, can be supported on a SDCCH.

Figure 4:
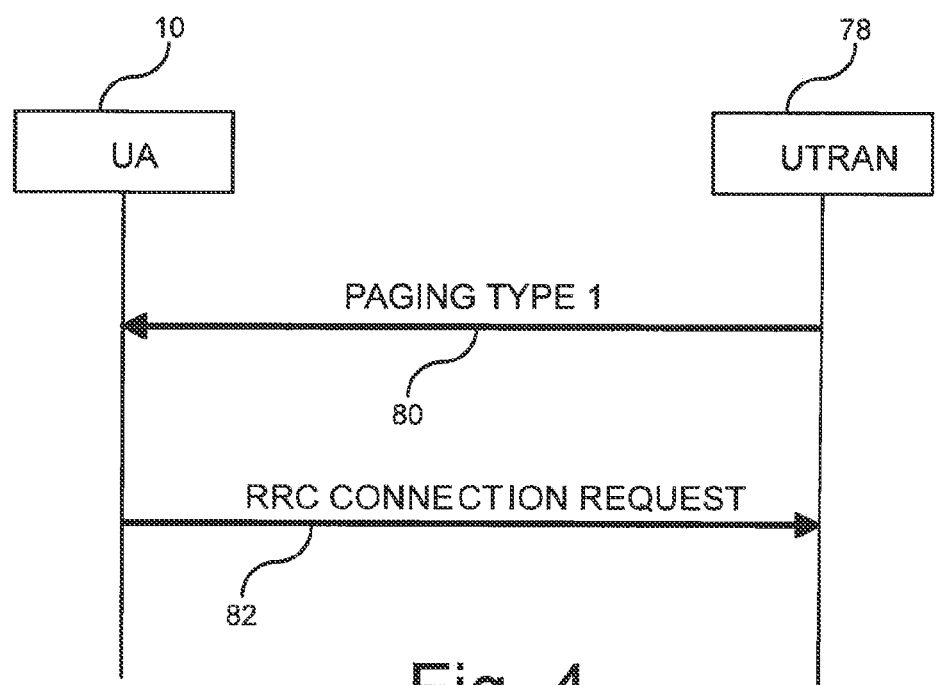
FIG. 4 is a data flow diagram illustrating an example Mobile Terminating call initiation in a UTRAN network wherein the UA is in idle mode.

Turning to another exemplary identified problem, FIG. 4, illustrates a mobile-terminating CS call in UTRAN network 78, with the UA 10 in idle mode. In this case, the UA 10 is typically provided with a "paging cause" information in the paging message sent by the UTRAN network 78, which is information that signals the type of service for which the UA is paged, for example, Terminating Conversational Call, Terminating High Priority Signaling, Terminating Low Priority Signaling, as indicated by "paging type 1" 80. This information is forwarded by the RRC protocol in the UA 10 to the upper layers, which in turn request the establishment of the RRC connection and map the RRC establishment cause to the received paging cause, which will be included in the RRC Connection Request 82 sent to the UTRAN network 78.

However in the case of paging a UA in E-UTRAN for a CS fallback terminating session, the paging (CS service notification) sent by the MME to the UA in connected mode in the source, packet only (e.g., PS), network does not contain any "paging cause" information. This paging notification may include information about the service for which the mobile station is paged.

In case the paging is made for reaching a UA in Idle mode, the paging message sent over the S1 interface and over the radio interface does not contain any indication of the service for which the UA is paged. Furthermore, the higher layers do not specify which information should be passed to the RRC protocol for inclusion in the RRC Connection Request in response to a paging having taken place in E-UTRAN for the case of the CS fallback procedure. Again, in UTRAN, this could lead to inconsistent UA implementations and result in significantly sub-optimal resource allocations or performances.

Figure 5:
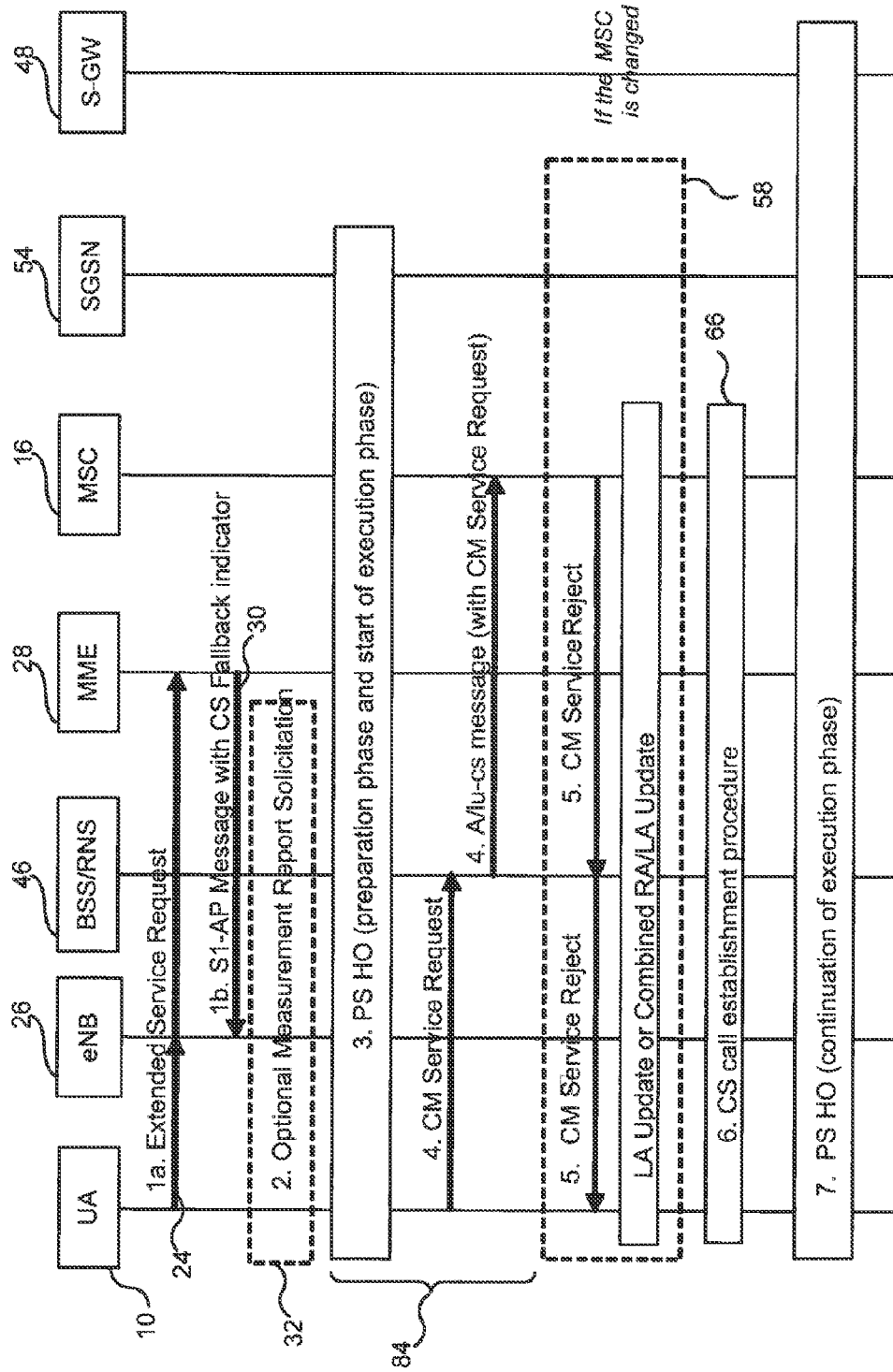
FIG. 5 is a data flow diagram illustrating an example Mobile Originating CS fallback procedure with Packet Switched Handover initiated in an E-UTRAN network.

In the case of a mobile-originating call in GERAN or in UTRAN, the UA includes in the channel request/RRC Connection Request sent to the network some additional information, such as channel type, establishment cause, and the like, allowing the network to allocate appropriate resource depending on the service which is requested. Turning now to FIG. 5, which is a variation on FIG. 2 but showing a dataflow for a mobile-originated call subject to CS fallback, the data flow includes operation 24 for handling a service request from the UA 10 to the network. The service type information element is included in the Extended Service Request message sent to the network. The service type information elements are as follows in Table 2:

TABLE 2

| Service type value (octet 1) | | | | |
|---|---|---|---|---|
| Service type value Bits | | | | |
| 4 | 3 | 2 | 1 | |
| 0 | 0 | 0 | 0 | mobile originating CS fallback or 1 × CS fallback |
| 0 | 0 | 0 | 1 | mobile terminating CS fallback or 1 × CS fallback |
| 0 | 0 | 1 | 0 | mobile originating CS fallback emergency call or 1 × CS fallback emergency call |

All other values are reserved.

However, this information element does not provide any information to the source network on the CS service requested, which, thus, does not allow the network to properly dimension the resources to be allocated according to the requested service and to determine optimal conditions for handing over the UA to the target CS network, for example, depending on available channels and load information, for the case inter-RAT handover or cell change order is supported.

In general, the present system and methods have been developed to reduce the delay and improve the reliability of a CS fallback process. CS fallback may be implemented for transitioning from E-UTRAN to GERAN, specifically, or, more generally, from a first network that does not provide CS domain services to a second network that does provide CS domain services. For example, CS fallback may be implemented to allow fallback from E-UTRAN networks to GERAN, UTRAN or CDMA2000 networks. To this end, the present system and method facilitates CS fallback by allowing a UA to identify the most appropriate resources for providing the requested service and then request those resources when transitioning to a CS network during CS fallback. In one implementation of the present system, the UA is configured to analyze available paging information received from the network to determine the most appropriate communication channel or radio resource to request for optimal CS fallback performance.

To initiate CS fallback, a UA may first receive a paging message from a source PS network (e.g., an E-UTRAN network). The paging message instructs the UA to implement CS fallback to a CS network (e.g., a GERAN network) to access a service. If the related service can be determined using the information conveyed in the paging message, the UA is configured to send a channel request message requesting a channel type suitable for that service on the CS network. As such, based upon one or more pieces of information contained in the paging message, the UA is configured to request particular channel types when implementing CS fallback.

For example, when the paging message is for a speech call or for any call requiring a traffic channel, the UA may be configured to request a "TCH/H or TCH/F", or else a "TCH/F" channel. Alternatively, when the paging message is for activating a call independent supplementary service, or a location service, for example, the UA may request a SDCCH. In these examples, the selection of a "TCH/H or TCH/F" channel may not require any particular preference for the selection of a half rate (H) or a full rate (F) channel. The network may make the determination of a full or half-rate channel autonomously depending on local conditions (network load status, quality of service (QoS) preferences, etc.). The selection of a TCHlF channel, however, may influence the network decision of whether to select a full or half-rate channel.

In some circumstances, the paging message will contain insufficient information for the UA to determine the service for which the UA is paged. In that case, the UA may be configured to build and send a channel request reflecting a "default" channel type, e.g. using the value "Any Channel" or some other indicator that identifies the default channel, Accordingly, in one example implementation of the present system, in the case of a CHANNEL REQUEST triggered by a CS fallback procedure, such as that described in 3GPP TS 23.272, the CHANNEL REQUEST message content may be determined depending on the information that can be derived from the paging notification received in the source radio access technology (RAT) about the service for which the mobile station is paged. If no specific information can be derived from the paging notification, the CHANNEL REQUEST message content may be set as for a Paging Indication value indicating "Any channel". For example, the CHANNEL REQUEST message content may be encoded in accordance with Table 3, with the "Paging Indication" entry selected according to the description above to indicate the related service.

TABLE 3

| MS Capability Paging Indication (note 3) | Full rate only | Dual rate (note 5) | SDCCH only |
|---|---|---|---|
| Any channel | 100xxxxx | 100xxxxx | 100xxxxx |
| SDCCH | 0001xxxx | 0001xxxx | 0001xxxx |
| TCH/F | 100xxxxx | 0010xxxx | 0001xxxx |
| TCH/H or TCH/F | 100xxxxx | 0011xxxx | 0001xxxx |

Alternatively, the UA may be configured to select a channel of "TCH/H or TCH/F", or SDCCH, depending on whether fast establishment or radio resource saving is preferred (the preference may be stored as user preferences, or determined by the network operator policy, for example), or some other factor that may require a particular default channel.

Depending upon the system implementation, the UA may be configured with an explicit mapping between the service indicated by the paging message and a channel type to be requested during fallback. In other cases, however, after determining the service indicated in the paging message, the UA may determine the channel type to request independently based upon other information available to the UA. If there is no explicit mapping, and the UA can independently determine the channel type to be requested, the UA may have more flexibility and may rely on other pieces of available information when identifying the channel type to request. In contrast, an explicit mapping may preclude different interpretations and ensure consistency in the channel selected by a UA in response to a particular paging message.

In one example of the present system, various information elements present in a CS Service Notification message transmitted between the MME and the UA may be inspected to determine the service for which the UA is paged and may, therefore, allow the UA to request the most appropriate channel type for providing that service. The calling line (CLI), supplementary service (SS) Code, LCS indicator, and LCS client identity information elements, for example, may be included within a CS Service Notification Message and their presence or absence can be indicative of the service being requested. Generally, the CLI contains the identification of the calling line for the mobile terminating call in the CS domain that triggered the paging via SGs. The SS Code information element contains information on the supplementary service transaction in the CS domain that triggered the paging via SGs. The LCS indicator indicates that the paging was triggered by a terminating LCS request in the CS domain. The LCS client identity contains information related to the requester of the terminating LCS request in the CS domain. Each of the information elements are sent by the network if they are originally received via SGs. Table 4 illustrates a CS SERVICE NOTIFICATION message content.

TABLE 4

| IEI | Information Element | Type/Reference | Presence | Format | Length |
|---|---|---|---|---|---|
| | Protocol discriminator | Protocol discriminator 9.2 | M | V | 1/2 |
| | Security header type | Security header type 9.3.1 | M | V | 1/2 |
| | CS service notification message identity | Message type 9.8 | M | V | 1 |
| | Paging identity | Paging identity 9.9.3.25A | M | V | 1 |
| 60 | CLI | CLI 9.9.3.38 | O | TLV | 3-14 |
| 61 | SS Code | SS Code 9.9.3.39 | O | TV | 2 |
| 62 | LCS indicator | LCS indicator 9.9.3.40 | O | TV | 2 |
| 63 | LCS client identity | LCS dent identity 9.9.3.41 | O | TLV | 3-257 |

These information elements may be originally received from the MSC/Visitor Location Register (VLR) in a SGsAP-PAGING-REQUEST message and passed along in the CS SERVICE NOTIFICATION message. The presence or absence of the information elements in the SGsAP-PAG- ING-REQUEST message is governed by various rulesets and is indicative of the type of service for which CS fallback is requested. For example, if the paging is due to a network-initiated Call Independent SS procedure as defined in 3GPP TS 24.010, the VLR includes the SS code in the SGsAP-PAGING-REQUEST message as defined in 3GPP TS 29.002. If, however, the paging is due to a Mobile Terminated Location Request as defined in 3GPP TS 24.030, the VLR may include the LCS client identity and LCS indicator as defined in 3GPP TS 29.002 in the SGsAP-PAGING-REQUEST. In accordance with these rules, the various information elements are included in the SGsAP-PAGING-REQUEST and are forwarded to the UA in the CS SERVICE NOTIFICATION message content. As such, the presence or the absence of one or several of these information elements allows the UA to make a determination of the service for which the UA is paged.

Table 5 illustrates an example SGsAP-PAGING_REQUEST message content.

TABLE 5

| Information element | Type/Reference | Presence | Format | Length |
| --- | --- | --- | --- | --- |
| Message type | Message type 9.2 | M | V | 1 |
| IMS | MS 9.4.6 | M | TLV | 6-10 |
| VLR name | VLR name 9.4.22 | M | TLV | 3-n |
| Service indicator | Service indicator 9.4.17 | M | TLV | 3 |
| TMSI | TMS I 9.4.20 | O | TLV | 6 |
| CLI | CLI 9.4.1 | O | TLV | 3-14 |
| Location area identifier | Location area identifier 9.4.11 | O | TLV | 7 |
| Global CN-Id | Global CN-Id 9.4.4 | O | TLV | 7 |
| SS code | SS code 9.4.19 | O | TLV | 3 |
| LCS indicator | LCS indicator 9.4.10 | O | TLV | 3 |
| LCS client identity | LCS client identity 9.4.9 | O | TLV | 3-n |

TABLE 5-continued

| Information element | Type/Reference | Presence | Format | Length |
| --- | --- | --- | --- | --- |
| Channel needed | Channel needed 9.4.23 | O | TLV | 3 |
| eMLPP Priority | eMLPP Priority 9.4.24 | O | TLV | 3 |

As shown in Table 5, the SS code is included if paging is due to a network-initiated Call Independent SS procedure (see 3GPP TS 24.010). The LCS indicator is included if the paging is due to a Mobile Terminated Location Request (see 3GPP TS 24.030). The LCS client identity is included if the paging is due to a Mobile Terminated Location Request (see 3GPP TS 24.030), The Channel needed information element is included if the VLR intends to indicate which channel the UA should use.

The UA may be further configured to inspect additional information to determine the services indicated by a particular paging request. The additional information may include other information elements that can be added in the future, including those identified below.

The present system may also be configured to include service related information available at the MME in paging messages used to page a UA in idle mode. For example, service related information may be added to S1 and RRC paging messages. In one example, the service related information may include the "SS Code", "LCS indicator", and "LCS client identity" information elements described above. The service related information may be communicated to the MME by the MSC/VLR over the SGs interface in the SGsRP-PAGING-REQUEST message. In some cases, these information elements are already present in the CS Service Notification message used to page a UA in connected mode and may, therefore, be added to the S1 interface Paging message by the MME and to the E-UTRAN RRC radio interface Paging message by the E-UTRAN RRC protocol. The additional information presented in the paging messages may then be used when the UA is paged in idle mode in addition to the case where the UA is paged in connected mode.

Table 6 illustrates an S1 interlace paging message that is modified to include the SS Code, LCS indicator, and LCS client identity information elements.

TABLE 6

| IE/Group Name | Presence | Range | IE type and reference | Semantics description | Criticality | Assigned Criticality |
| --- | --- | --- | --- | --- | --- | --- |
| Message Type | M | | 9.2.1.1 | | YES | ignore |
| UE Identity Index value | M | | 9.2.3.10 | | YES | ignore |
| UE Paging Identity | M | | 9.2.3.13 | | YES | ignore |
| Paging DRX | O | | 9.2.1.16 | | YES | ignore |
| CN Domain | M | | 9.2.3.22 | | YES | ignore |
| List of TAIs | M | | | | YES | ignore |
| >TAI List Item | | 1 to < maxnoofTAIs > | | | EACH | ignore |
| >>TAI | M | | 9.2.3.16 | | — | |
| CSG Id List | | 0 to < maxno ofCSGId > | | | GLOBAL | ignore |
| >CSG Id | M | | 9.2.1.62 | | — | |
| SS Code | O | | 9.2.x.y | | — | |
| LCS indicator | O | | 9.2.x.y | | — | |
| LCS client identity | O | | 9.2.x.y | | — | |

Table 7 illustrates an E-UTRAN RRC protocol paging message that is modified to include the SS Code, LCS indicator, and LOS client identity information elements.

TABLE 7

```
-- ASN1START
Paging ::=                    SEQUENCE {
    pagingRecordList              PagingRecordList
    OPTIONAL,  -- Need ON
    systemInfoModification        ENUMERATED {true}
    OPTIONAL,  -- Need ON
    etws-Indication               ENUMERATED {true}
    OPTIONAL,  -- Need ON
    nonCriticalExtension          SEQUENCE { }
    OPTIONAL  -- Need OP
}
PagingRecordList ::=          SEQUENCE (SIZE (1..maxPageRec))
PagingRecord                  OF
PagingRecord ::=              SEQUENCE {
    ue-Identity                   PagingUA-Identity,
    cn-Domain                     ENUMERATED {ps, cs},
    ...
    ss-Code                       OCTET STRING (SIZE(1)),
    lcs-Indicator                 OCTET STRING (SIZE(1)),
    lcs-Client-Identity           OCTET STRING (SIZE(1..255))
    ...
}
PagingUA-Identity ::=         CHOICE {
    s-TMSI                        S-TMSI,
    imsi                          IMSI,
    ...
}
IMSI ::=                      SEQUENCE (SIZE (6..21)) OF IMSI-Digit
IMSI-Digit::=                 INTEGER (0..9)
-- ASN1STOP
```

Referring to Table 7, the ss-Code conveys information related to a network initiated supplementary service request. The lcs-Indicator indicates that the origin of the message is due to a LCS request and the type of this request. The coding of the lcs-Indicator is given by the value part of the LCS indicator information element in TS 24.301. The lcs-Client-Identity conveys information related to the client of a LCS request. The coding of the LCS client identity is given in subclause 17.7.13 of 3GPP TS 29.002.

Figure 6:
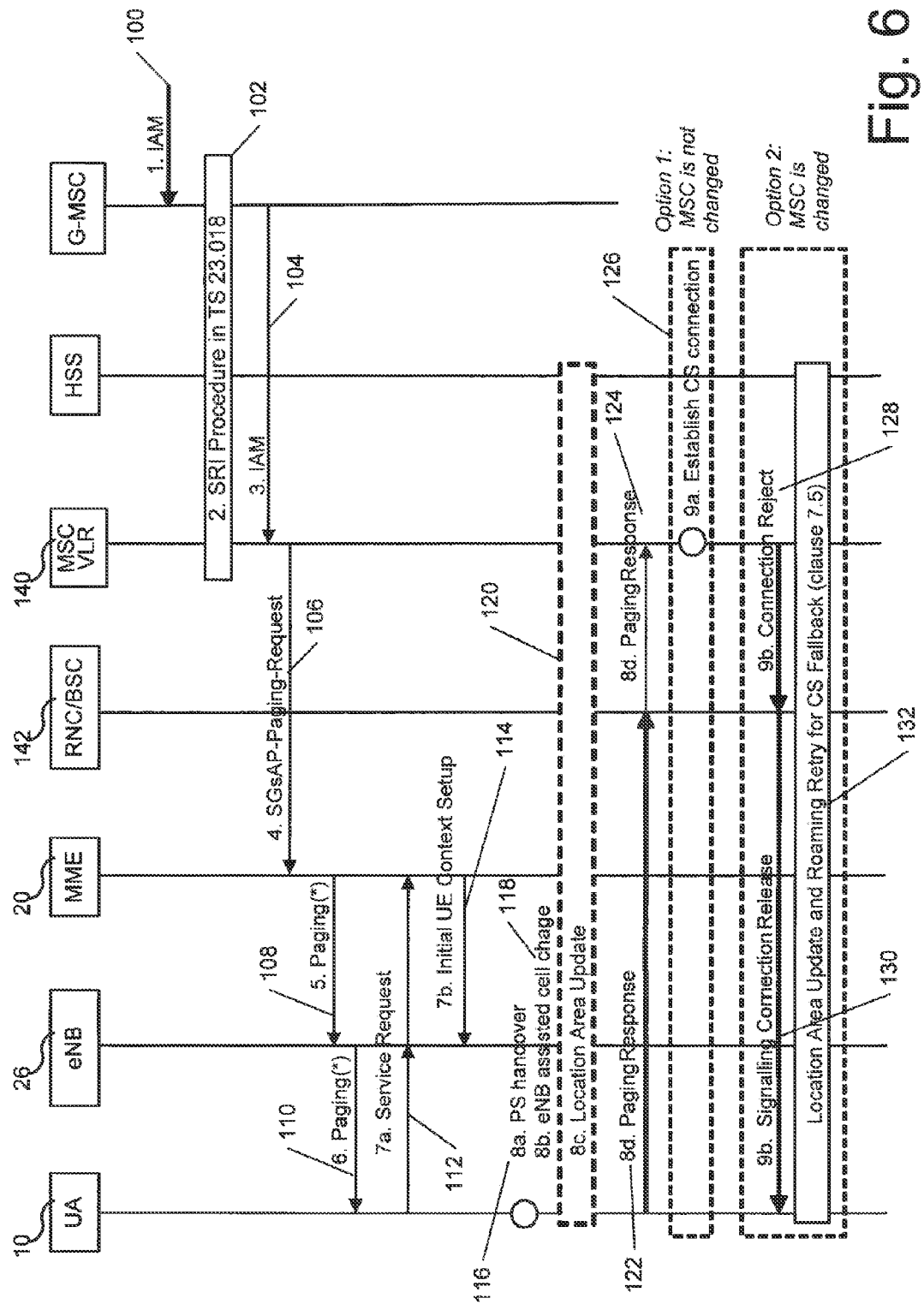
FIG. 6 is an illustration of data flow for implementing an example Mobile Terminating CS fallback where service related information is passed to the UA in idle mode within a paging message.

FIG. 6 is an illustration of a message flow for implementing CS fallback where service related information is passed to UA 10 within a paging message. In steps 100, 102, and 104 a UA-terminated call arrives at the MSC/VLR 140. In step 106, a SGsAP-Paging-Request message is transmitted to the MME 20. The SGsAP-Paging-Request may include one or more information elements indicative of the service type requested. In steps 108 and 110 the MME 20 forwards a paging message to the UA 10. The paging message is modified to include one or more of the information elements described above. The presence or absence of one or more of the information elements allows the UA to identify the service type for which the paging message is sent. As a result, in step 112 the UA can request an appropriate resource for the service. In step 114, in response to the service request, the MME 20 issues an initial UA context setup message. In step 116, 118 and 120 a PS handover or, alternatively, a base station assisted cell change, or a RRC release with redirection, possibly followed by a location area update are completed. In step 122 the paging response is transmitted to the RNC/BSC 142 from the UA 10 and the paging response is forwarded to the MSC/VLR 140 in step 124. If the MSC is not changed, the CS connection is established in step 126 and the CS fallback process is completed. If the MSC is changed, however, in step 128 the MSC/VLR 140 transmits a connection rejection to the RNC/BSC 142. In response, the RNC/BSC 142 transmits a signaling connection release to the UA 10 in step 130. At that point, a location area update and roaming retry is initiated to against attempt CS fallback in step 132.

Alternatively, to facilitate CS fallback, a Channel Needed information element, when know to the MME, may be added to Paging messages sent to a UA to page the UA in idle or connected mode. For example, a Channel Needed information element may be added to the CS Service Notification NAS message (described above) transmitted between the MME and the UA, the S1 interface Paging message described above, or the RRC radio interface protocol described above. In some cases, the data used to populate the Channel Needed information element is communicated to the MME by the MSC/VLR over the SGs interface in the SGsAP-PAGING-REQUEST message, as described above. The Channel Needed information, when present within a paging message, allows the UA to efficiently create an appropriate channel request message when the UA answers the CS fallback page in GERAN, as the same information would be present as in the GERAN paging message (if transmitted by the MSC/VLR).

For enabling the UA paged in E-UTRAN for a Mobile Terminating CS call with fallback to send an appropriate establishment cause when answering in an UTRAN network, new mapping entries may be introduced. This would allow the UA to communicate to the network the appropriate establishment causes reflecting the service for which the UA is paged, if the related service can be assessed from the information conveyed in the paging message. In that case, the UA, when answering in UTRAN to a page received in the source packet network (e.g. E-UTRAN), may include the mapped establishment cause communicated by the upper layers in the RRC Connection Request message.

As an example, the establishment cause may be determined as follows: The establishment cause may be "Terminating Conversational Call" when the received page is for a speech call or for any other conversational CS call, or "Terminating High Priority Signalling" when the received page is for activating a call independent supplementary service, or a location service.

If the service for which the UA is paged cannot be assessed from the information available from the network, the UA may use "Terminating—cause unknown" as the establishment cause.

Table 8 illustrates an exemplary mapping of CS NAS procedure to establishment cause.

TABLE 8

| CS NAS procedure | RRC Establishment cause (according 3GPP TS 25.331 [23c]) |
| --- | --- |
| Originating CS speech call | Originating Conversational Call |
| Originating CS data call | Originating Conversational Call |
| CS Emergency call | Emergency call |
| Call re-establishment | Call re-establishment |
| Location update | Registration |
| IMSI Detach | Detach |
| MO SMS via CS domain | Originating Low Priority Signalling |
| Supplementary Services | Originating High Priority Signalling |
| Answer to circuit switched paging | Set equal to the value of the paging cause used in the reception of paging in the RRC layer |
| SS part of Location services Answer to circuit switched paging in case of Terminating CS | Originating High Priority Signalling |

TABLE 8-continued

| CS NAS procedure | RRC Establishment cause (according 3GPP TS 25.331 [23c]) |
|---|---|
| fallback: | |
| Terminating CS speech/data call | Terminating Conversational Call |
| Supplementary Services | Terminating High Priority Signalling |
| Location Services | Terminating High Priority Signalling |
| Not determined | Terminating—cause unknown |

Various information elements, when present in a CS Service Notification message between the MME and the UA, may provide an indication of the service for which the mobile is paged, including the "SS Code", "LCS indicator", and "LCS client identity" information elements. The various information elements may be received from the MSC/VLR in a SGsAP-PAGING-REQUEST message as described above. The presence or the absence of one or several of these information elements may therefore allow the UA to make a determination of the service for which the UA is paged. Any other information that could be accessed or retrieved by the UA from messages received from the network or other sources may be used to determine the service for which the UA is paged. This may include new information elements added in the future, including those described above.

When initiating a Mobile Originating (MO) call, the UA may be configured to provision additional information to the PS network describing the requested CS service for which CS fallback may be triggered. In one implementation, the UA includes additional information in the Extended Service Request message transmitted to the MME of the PS network describing the CS service being requested. Similarly, the additional information may be included in an INITIAL CONTEXT SETUP REQUEST, or UA CONTEXT MODIFICATION REQUEST messages transmitted from the MME to the eNodeB using the S1 interface (see 3GPP TS 36.413).

Table 9 and Table 10 illustrate a modified Extended Service Request message including additional information describing the CS service requested by a UA initiating a MO call resulting in CS fallback.

TABLE 9

| IEI | Information Element | Type/Reference | Presence | Format | Length |
|---|---|---|---|---|---|
| | Protocol discriminator | Protocol discriminator 9.2 | M | V | 1/2 |
| | Security header type | Security header type 9.3.1 | M | V | 1/2 |
| | Extended service request message identity | Message type 9.8 | M | V | 1 |
| | Service type | Service type 9.9.3.27 | M | V | 1/2 |
| | NAS key set identifier | NAS key set identifier 9.9.3.21 | M | V | 1/2 |
| | M-TMSI | Mobile identity 9.9.2.3 | M | LV | 6 |
| B- | CSFB response | CSFB response 9.9.3.5 | C | TV | 1 |
| C- | Extended service request cause | Extended service request cause 9.9.x.y | C | TV | 1 |

TABLE 10

| 8 | 7 | 6 | 5 | 4 | 3 | 2 | 1 | |
|---|---|---|---|---|---|---|---|---|
| Extended service request cause IEI | | | | 0 spare | Extended service request cause value | | | octet 1 |

As shown in Table 9 and Table 10, the Extended Service Request message shown in Table 9 includes an additional element called "Extended service request cause". The detail of the Extended service request cause information element is shown in Table 10, The Extended service request cause element is configured to store an identifier value in octet 1 that describes the requested CS service. For example, the identifier may be used to refer to CS services such as Originating Conversational Call, Originating High Priority Signalling, or Originating Low Priority Signalling. Table 11 illustrates one exemplary configuration of octet 1 of the Extended service request cause information element.

TABLE 11

Extended service request cause value (octet 1)

| Bits | | | |
|---|---|---|---|
| 3 | 2 | 1 | |
| 0 | 0 | 0 | Originating Conversational Call |
| 0 | 0 | 1 | Originating High Priority Signalling |
| 0 | 1 | 0 | Originating Low Priority Signalling |

All other values are reserved.

In some cases, the existing Service type information element present within existing Extended Service Request messages may be modified and used to identify the CS service being requested. Alternatively, additional information elements that indicate the originating service, such as "SS Code" or "LCS indicator" defined for the Service Notification message may be included in the message when a UA initiates a Mobile Originating call. In another example, the CS service information may be included in the RRC-ConnectionRequest message (see 3GPP TS 36.331) that may be used to transition the UA from idle mode to connected mode when initiating a Mobile Originating call subject to CS fallback.

Figure 7:
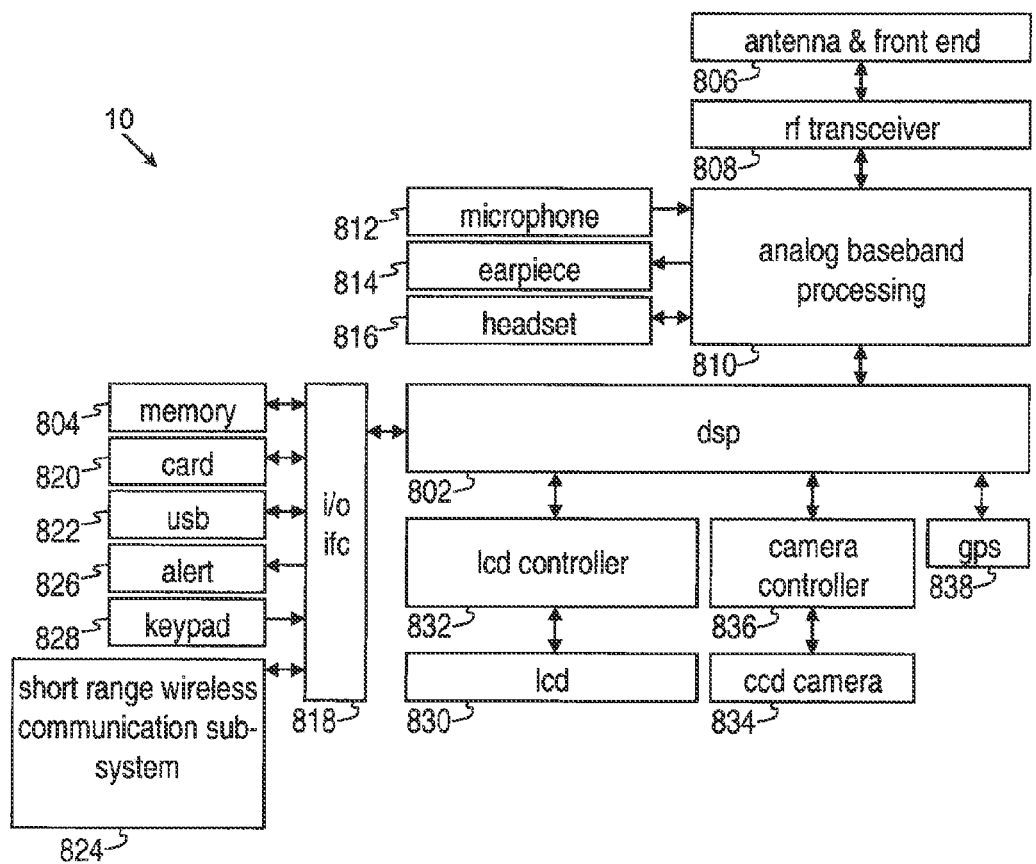
FIG. 7 shows a block diagram of the user equipment (UA)

FIG. 7 shows an example block diagram of the UA 10. While a variety of known components of UAs 10 are depicted, in an embodiment a subset of the listed components and/or additional components not listed may be included in the UA 10. The UA 10 includes a processor such as a digital signal processor (DSP) 802, and a memory 804. As shown, the UA 10 may further include an antenna and front end unit 806, a radio frequency (RF) transceiver 808, and an analog baseband processing unit 810. In various configurations, UA 10 may include additional, optional components as illustrated in FIG. 7. The additional components may include, for example, a microphone 812, an earpiece speaker 814, a headset port 816, an input/output interface 818, a removable memory card 820, a universal serial bus (USB) port 822, a short range wireless communication sub-system 824, an alert 826, a keypad 828, a liquid crystal display (LCD), which may include a touch sensitive surface 830, an LCD controller 832, a charge-coupled device (CCD) camera 834, a camera controller 836, and a global positioning system (GPS) sensor 838. In an embodiment, the UA 10 may include another kind of display that does not provide a touch sensitive screen. In an embodiment, the DSP 802 may communicate directly with the memory 804 without passing through the input/output interface 818.

The DSP 802 or some other form of controller or central processing unit operates to control the various components of the UA 10 in accordance with embedded software or firmware stored in memory 804 or stored in memory contained within the DSP 802 itself. In addition to the embedded software or firmware, the DSP 802 may execute other applications stored in the memory 804 or made available via information carrier media such as portable data storage media like the removable memory card 820 or via wired or wireless network communications. The application software may comprise a compiled set of machine-readable instructions that configure the DSP 802 to provide the desired functionality, or the application software may be high-level software instructions to be processed by an interpreter or compiler to indirectly configure the DSP 802.

The antenna and front end unit 806 may be provided to convert between wireless signals and electrical signals, enabling the UA 10 to send and receive information from a cellular network or some other available wireless communications network or from a peer UA 10. In an embodiment, the antenna and front end unit 806 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 806 may include antenna tuning and/or impedance matching components, RF power amplifiers, and/or low noise amplifiers.

The RF transceiver 808 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 810 and/or the DSP 802 or other central processing unit. In some embodiments, the RF transceiver 808, portions of the antenna and front end 806, and the analog baseband processing unit 810 may be combined in one or more processing units and/or application specific integrated circuits (ASICs). The analog baseband processing unit 810 may provide various analog processing of inputs and outputs, for example analog processing of inputs from the microphone 812 and the headset 816 and outputs to the earpiece 814 and the headset 816.

The DSP 802 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 802 may perform modulation, coding, interleaving, and spreading, and for a receiver function the DSP 802 may perform despreading, deinterleaving, decoding, and demodulation. In another embodiment, for example in an orthogonal frequency division multiplex access (OFDMA) technology application, for the transmitter function the DSP 802 may perform modulation, coding, interleaving, inverse fast Fourier transforming, and cyclic prefix appending, and for a receiver function the DSP 802 may perform cyclic prefix removal, fast Fourier transforming, deinterleaving, decoding, and demodulation. In other wireless technology applications, yet other signal processing functions and combinations of signal processing functions may be performed by the DSP 802. The DSP 802 may communicate with a wireless network via the analog baseband processing unit 810.

Figure 8:
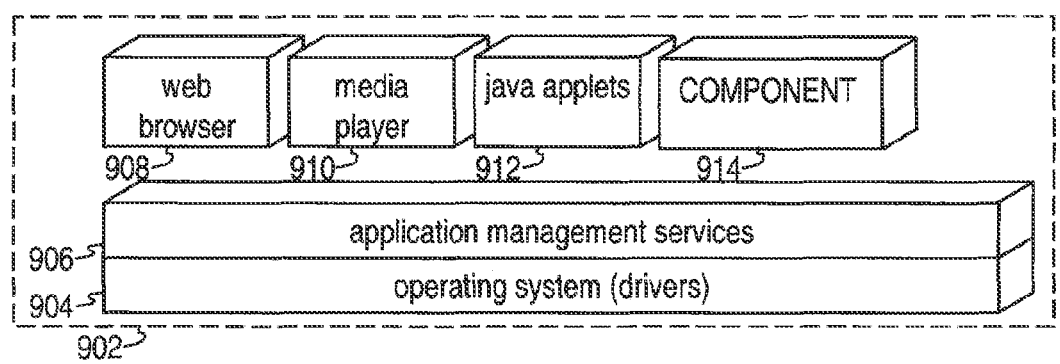
FIG. 8 illustrates a software environment that may be implemented by a processor of a user equipment.

FIG. 8 illustrates a software environment 902 that may be implemented by a processor or controller of the UA 10. The software environment 902 includes operating system drivers 904 that are executed by the processor or controller of the UA 10 to provide a platform from which the rest of the software operates. The operating system drivers 904 provide drivers for the UA hardware with standardized interfaces that are accessible to application software. The operating system drivers 904 include application management services CAMS") 906 that transfer control between applications running on the UA 10. Also shown in FIG. 8 are a web browser application 908, a media player application 910, and Java applets 912.

Figure 9:
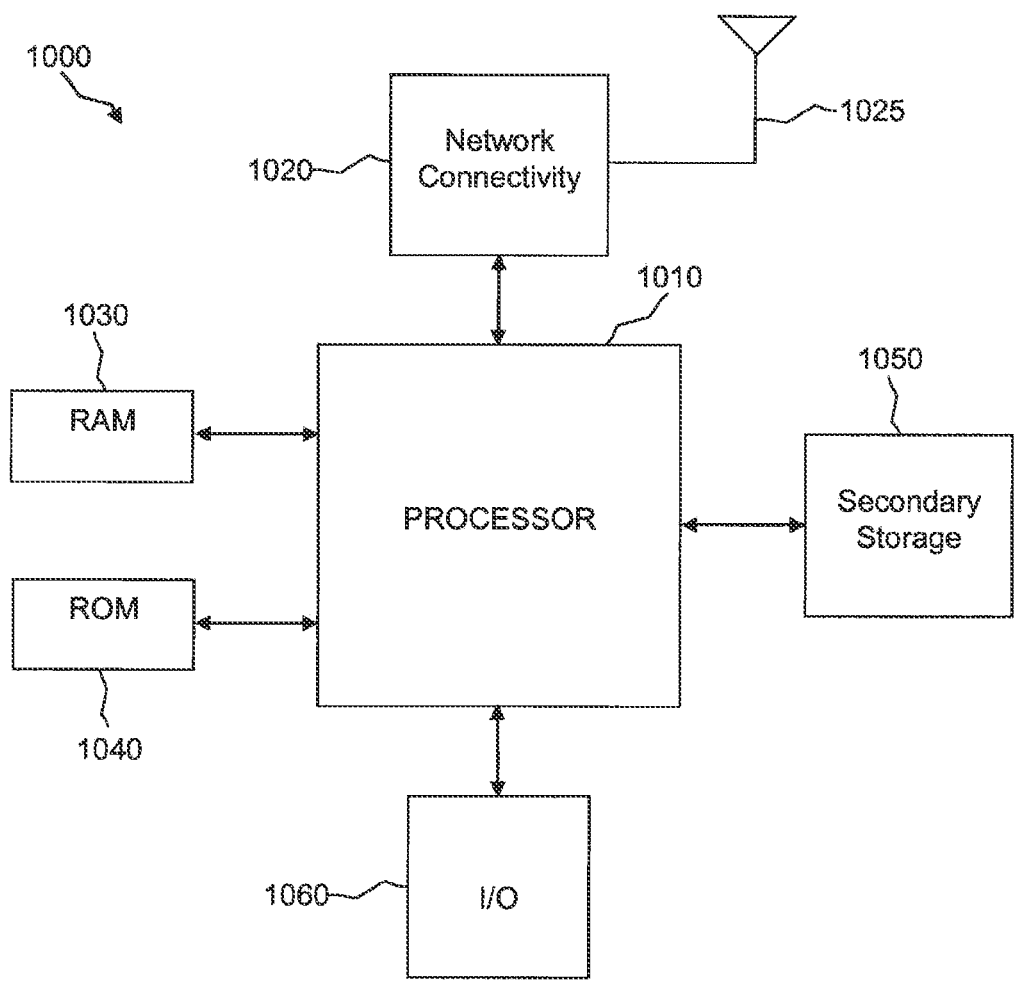
FIG. 9 illustrates an example of a system that includes a processing component suitable for implementing a method for providing continuity for sessions transitioning between networks.

The UA 10 includes a processing component such as a DSP that is capable of executing instructions related to the actions described above. FIG. 9 illustrates an example of a system 1000 including one or more of the components that provides the functionality of UA 10. System 1000 includes a processing component 1010 suitable for implementing one or more embodiments disclosed herein, In addition to the processor 1010 (which may be referred to as a central processor unit (CPU or DSP), the system 1000 might include network connectivity devices 1020, random access memory (RAM) 1030, read only memory (ROM) 1040, secondary storage 1050, and input/output (I/O) devices 1060. In some cases, some of these components may not be present or may be combined in various combinations with one another or with other components not shown. Any actions described herein as being taken by the processor 1010 might be taken by the processor 1010 alone or by the processor 1010 in conjunction with one or more components shown or not shown in the drawing.

The processor 1010 executes instructions, codes, computer programs, or scripts that it might access from the network connectivity devices 1020, RAM 1030, ROM 1040, or secondary storage 1050 (which might include various disk-based systems such as hard disk, floppy disk, or optical disk). While only one processor 1010 is shown, multiple processors may be present. Thus, while instructions may be discussed as being executed by a processor, the instructions may be executed simultaneously, serially, or otherwise by one or multiple processors. The processor 1010 may be implemented as one or more CPU chips.

The network connectivity devices 1020 may include one or more transceiver components 1025 capable of transmitting and/or receiving data wirelessly in the form of electromagnetic waves, such as radio frequency signals or microwave frequency signals. The transceiver component 1025 might include separate receiving and transmitting units or a single transceiver. Information transmitted or received by the transceiver 1025 may include data that has been processed by the processor 1010 or instructions that are to be executed by processor 1010. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1030 might be used to store volatile data and perhaps to store instructions that are executed by the processor 1010. The ROM 1040 is a non-volatile memory device that typically has a smaller memory capacity than the memory capacity of the secondary storage 1050. ROM 1040 might be used to store instructions and perhaps data that are read during execution of the instructions. Access to both RAM 1030 and ROM 1040 is typically faster than to secondary storage 1050.

The I/O devices 1060 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1025 might be considered to be a component of the I/O devices 1060 instead of or in addition to being a component of the network connectivity devices 1020. Some or all of the I/O devices 1060 may be substantially similar to various components depicted in the previously described drawing of the UA 10, such as the display 702 and the input 704.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made without departing from the spirit and scope disclosed herein.

To apprise the public of the scope of this disclosure, the following claims are made:

1. A method implemented by a wireless device for circuit switched (CS) fallback from a first network that does not provide CS domain service, the method comprising:
    receiving from the first network a paging message indicative of one of a plurality of circuit switched domain services, wherein the one of the plurality of circuit switched domain services is one of a first category of service including CS speech calls and CS services using a traffic channel or conversational resources, a second category of service including mobile terminated location requests, or a third category of service including supplementary services;
    selecting a channel type, among a plurality of channel types, based on the one of the plurality of circuit switched domain services indicated by the paging message, wherein selecting the channel type comprises:
        if the one of the plurality of circuit switched domain services is in the first category of service, selecting the channel type as either a half-rate traffic channel TCH/H or a full-rate traffic channel TCH/F; and
        if the one of the plurality of circuit switched domain services is in at least one of the second category or the third category of service, selecting the channel type as a stand-alone dedicated control channel SDCCH; and
    in response to the selecting, transmitting, to a second network, a request message for initiating establishment of an initial radio connection with the second network, the request message indicative of the selected channel type.

2. The method of claim 1, wherein selecting comprises detecting at least one of a supplementary service SS code information element, a location service LCS indicator element, or an LCS client identity information element within the paging message; and wherein
    when the paging message includes the SS code information element, the one of the plurality of circuit switched domain services is a call independent supplementary service; and
    when the paging message includes at least one of the LCS indicator information element or the LCS client identity information element, the one of the plurality of circuit switched domain services is a mobile terminated location request.

3. The method of claim 1, wherein the paging message includes a CS SERVICE NOTIFICATION MESSAGE.

4. The method of claim 1, wherein the paging message includes an E-UTRAN RRC protocol paging message received after a preliminary paging procedure implemented using an S1 interface.

5. A wireless device configured to perform circuit switched fallback from a first network that does not provide a circuit switched domain service, the wireless device comprising:
    one or more processors configured to:
        receive from the first network a paging message indicative of one of a plurality of circuit switched domain services, wherein the one of the plurality of circuit switched domain services is one of a first category of service including CS speech calls and CS services using a traffic channel or conversational resources, a second category of service including mobile terminated location requests, or a third category of service including supplementary services;
        select a channel type, among a plurality of channel types, based on the one of the plurality of circuit switched domain services indicated by the paging message, wherein selecting the channel type comprises:
            if the one of the plurality of circuit switched domain services is in the first category of service, selecting the channel type as either a half-rate traffic channel TCH/H or a full-rate traffic channel TCH/F; and
            if the one of the plurality of circuit switched domain services is in at least one of the second category or the third category of service, selecting the channel type as a stand-alone dedicated control channel SDCCH; and
        in response to the selecting, transmit, to a second network, a request message for initiating establishment of an initial radio connection with the second network, the request message indicative of the selected channel type.

6. The wireless device of claim 5, wherein the one or more processors configured to select comprises the one or more processors configured to detect at least one of a supplementary service SS code information element, a location service LCS indicator element, or an LCS client identity information element within the paging message; and wherein
when the paging message includes the SS code information element, the one of the plurality of circuit switched domain services is a call independent supplementary service; and
when the paging message includes at least one of the LCS indicator information element or the LCS client identity information element, the one of the plurality of circuit switched domain services is a mobile terminated location request.

7. The wireless device of claim 5, wherein the paging message includes a CS SERVICE NOTIFICATION MESSAGE.

8. The wireless device of claim 5, wherein the paging message includes an E-UTRAN RRC protocol paging message received after a preliminary paging procedure implemented using an S1 interface.

9. A non-transitory computer readable medium for circuit switched (CS) fallback from a first network that does not provide CS domain service, the computer readable medium storing instructions to cause a processor to perform operations comprising:
receiving from the first network a paging message indicative of one of a plurality of circuit switched domain services, wherein the one of the plurality of circuit switched domain services is one of a first category of service including CS speech calls and CS services using a traffic channel or conversational resources, a second category of service including mobile terminated location requests, or a third category of service including supplementary services;
selecting a channel type, among a plurality of channel types, based on the one of the plurality of circuit switched domain services indicated by the paging message, wherein selecting the channel type comprises:
if the one of the plurality of circuit switched domain services is in the first category of service, selecting the channel type as either a half-rate traffic channel TCH/H or a full-rate traffic channel TCH/F; and
if the one of the plurality of circuit switched domain services is in at least one of the second category or the third category of service, selecting the channel type as a stand-alone dedicated control channel SDCCH; and
in response to the selecting, transmitting, to a second network, a request message for initiating establishment of an initial radio connection with the second network, the request message indicative of the selected channel type.

10. The computer readable medium of claim 9, wherein the instructions comprising selecting comprises the instructions comprising detecting at least one of a supplementary service SS code information element, a location service LCS indicator element, or an LCS client identity information element within the paging message; and wherein
when the paging message includes the SS code information element, the one of the plurality of circuit switched domain services is a call independent supplementary service; and
when the paging message includes at least one of the LCS indicator information element or the LCS client identity information element, the one of the plurality of circuit switched domain services is a mobile terminated location request.

11. The computer readable medium of claim 9, wherein the paging message includes a CS SERVICE NOTIFICATION MESSAGE.

12. The computer readable medium of claim 9, wherein the paging message includes an E-UTRAN RRC protocol paging message received after a preliminary paging procedure implemented using an S1 interface.

* * * * *